(12) United States Patent
Tamai et al.

(10) Patent No.: US 11,251,424 B2
(45) Date of Patent: Feb. 15, 2022

(54) LITHIUM ION SECONDARY BATTERY

(71) Applicant: NEC CORPORATION, Tokyo (JP)

(72) Inventors: Suguru Tamai, Tokyo (JP); Hitoshi Ishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 111 days.

(21) Appl. No.: 16/611,927

(22) PCT Filed: May 17, 2018

(86) PCT No.: PCT/JP2018/019096
§ 371 (c)(1),
(2) Date: Nov. 8, 2019

(87) PCT Pub. No.: WO2018/212274
PCT Pub. Date: Nov. 22, 2018

(65) Prior Publication Data
US 2021/0151749 A1 May 20, 2021

(30) Foreign Application Priority Data
May 18, 2017 (JP) .............................. JP2017-099013

(51) Int. Cl.
*H01M 4/38* (2006.01)
*H01M 10/0525* (2010.01)
(Continued)

(52) U.S. Cl.
CPC ......... *H01M 4/386* (2013.01); *H01M 10/058* (2013.01); *H01M 10/0525* (2013.01);
(Continued)

(58) Field of Classification Search
CPC ........... H01M 10/052; H01M 10/0525; H01M 10/0567; H01M 10/058; H01M 10/446;
(Continued)

(56) References Cited

U.S. PATENT DOCUMENTS

2017/0162910 A1* 6/2017 Katou ............... H01M 10/0567

FOREIGN PATENT DOCUMENTS

JP 2006-294373 A 10/2006
JP 2008-293872 A 12/2008
(Continued)

OTHER PUBLICATIONS

Communication dated Nov. 17, 2020 by the Japanese Patent Office in application No. 2019-518859.
(Continued)

*Primary Examiner* — Carlos Barcena
(74) *Attorney, Agent, or Firm* — Sughrue Mion, PLLC (57) ABSTRACT

A purpose of one embodiment of the present invention is to provide a lithium ion secondary battery which has improved cycle characteristics and comprises a Si material in the negative electrode. The lithium ion secondary battery according to the present invention comprises a negative electrode comprising a negative electrode active material, a positive electrode comprising a positive electrode active material and an electrolyte solution, wherein the negative electrode active material comprises a Si material, and a ratio ($I_a/I_b$) of a peak intensity ($I_a$) at 290 eV to a peak intensity ($I_b$) at 285 eV is 0.7 or more in a C1s spectrum obtained by surface analysis of the negative electrode by X-ray photoelectron spectroscopy.

7 Claims, 3 Drawing Sheets

(51) Int. Cl.
*H01M 10/0567* (2010.01)
*H01M 10/058* (2010.01)
*H01M 10/44* (2006.01)
*H01M 4/02* (2006.01)

(52) U.S. Cl.
CPC ..... *H01M 10/0567* (2013.01); *H01M 10/446* (2013.01); *H01M 2004/027* (2013.01); *H01M 2220/20* (2013.01); *H01M 2300/0025* (2013.01)

(58) Field of Classification Search
CPC ....... H01M 2004/027; H01M 2220/20; H01M 2300/0025; H01M 4/134; H01M 4/36; H01M 4/38; H01M 4/386
See application file for complete search history.

(56) References Cited

FOREIGN PATENT DOCUMENTS

| | | | |
|---|---|---|---|
| JP | 2015-064983 A | | 4/2015 |
| JP | 2015-072867 A | | 4/2015 |
| JP | WO2016/010090 | * | 1/2016 |
| JP | 2016-103325 A | | 6/2016 |
| WO | 2004086549 A1 | | 10/2004 |
| WO | 2011001620 A1 | | 1/2011 |

OTHER PUBLICATIONS

International Search Report for PCT/JP2018/019096 dated Aug. 21, 2018. [PCT/ISA/210].

* cited by examiner

LITHIUM ION SECONDARY BATTERY

CROSS REFERENCE TO RELATED APPLICATIONS

This application is a National Stage of International Application No. PCT/JP2018/019096 filed May 17, 2018, claiming priority based on Japanese Patent Application No. 2017-099013, filed May 18, 2017, the disclosures of which are incorporated herein in their entirety by reference.

TECHNICAL FIELD

The present invention relates to a lithium ion secondary battery, a manufacturing method thereof and a vehicle equipped with a lithium ion secondary battery.

BACKGROUND ART

Lithium ion secondary batteries are used in various applications. Accordingly, there is a demand for a lithium ion secondary battery that has higher energy density. To increase the energy density of a battery, using a Si material having a large capability of absorbing and releasing lithium ions per unit volume in a negative electrode has been studied. However, since the Si material largely expands and contracts during charge and discharge, an active surface of the active material generated by the expansion and contraction decomposes an electrolyte solution, causing a decrease in the capacity retention rate of a battery.

In order to improve the deterioration in capacity retention rate, it is effective to add to an electrolyte solution an additive forming a coating film suppressing the decomposition of an electrolyte solution on a negative electrode. Patent Document 1 discloses that the capacity retention rate of a battery using the Si material in the negative electrode can be improved by using fluoroethylene carbonate and vinylene carbonate as additives.

CITATION LIST

Patent Literature

Patent Document 1: Japanese patent laid-open No. 2015-064983

SUMMARY OF INVENTION

Technical Problem

However, even when the above-described electrolytic solution containing the additive such as vinylene carbonate or fluoroethylene carbonate is used, the battery using the Si material in the negative electrode still has the problem of large drop in capacity after charge and discharge cycles. For this reason, further improvement in cycle characteristics is demanded.

In view of the above mentioned problem, a purpose of the present invention is to provide a lithium ion secondary battery which has improved cycle characteristics and comprises a Si material in the negative electrode.

Solution to Problem

The first lithium ion secondary battery according to the present invention comprises a negative electrode comprising a negative electrode active material, a positive electrode comprising a positive electrode active material and an electrolyte solution, wherein the negative electrode active material comprises a Si material, and a ratio (Ia/Ib) of a peak intensity (Ia) at 290 eV to a peak intensity (Ib) at 285 eV is 0.7 or more in a C1s spectrum obtained by surface analysis of the negative electrode by X-ray photoelectron spectroscopy.

Advantageous Effects of Invention

According to one embodiment of the present invention, it is possible to provide a lithium ion secondary battery which has improved cycle characteristics and comprises a Si material in the negative electrode.

DESCRIPTION OF EMBODIMENTS

Hereinafter, one example of the lithium ion secondary battery of the present embodiment will be described for each component.

<Negative Electrode>

The negative electrode comprises a negative electrode current collector and a negative electrode active material layer which is provided on the negative electrode current collector and comprises a negative electrode active material, a negative electrode binder and optionally a conductive assisting agent.

The negative electrode active material comprises a material comprising silicon as a constituent element (hereinafter, this is also referred to as a Si material). Examples of the Si material include metal silicon, alloys comprising silicon, silicon oxides denoted by the composition formula, $SiO_x$ ($0 < x \leq 2$). The other metals used in the alloys comprising silicon are preferably selected from the group consisting of Li, Al, Ti, Pb, Sn, In, Bi, Ag, Ba, Ca, Hg, Pd, Pt, Te, Zn and La. The particle surface of the Si material may be coated with carbon. The carbon coating may improve cycle characteristics. The carbon coating may be formed, for example, by a sputtering method, a vapor deposition method or the like, using a carbon source. The Si materials are known as active materials having a large capability of absorbing and releasing lithium ions per unit volume. A battery having a high Si material content may therefore have high energy density.

When the silicon oxide or the alloy comprising silicon, among the Si materials, is used as the negative electrode active material, a battery having better cycle characteristics may be provided. In particular, the silicon oxide is preferred.

The Si material may be used in combination with another negative electrode active material. In particular, the Si material is preferably used in combination with carbon. The carbon can reduce the influence of the expansion and contraction and can improve cycle characteristics of the battery. Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

The amount of the Si material is preferably 5 weight % or more, more preferably 30 weight % or more, particularly preferably 70 weight % or more and may be 100 weight %, with respect to the total amount of the negative electrode active material. The coating film described later is easily formed on the Si material. The improvement effect of cycle characteristics therefore is increased in the case of high Si material content. The negative electrode active material is a material capable of absorbing and releasing lithium. Herein, the negative electrode active material does not include materials not absorbing and releasing lithium, for example, binders.

The negative electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide or the like may be used. Also, the negative electrode binder includes mixtures, copolymers or cross-linked bodies of a plurality of the above resins, for example, styrene butadiene rubber (SBR). When an aqueous binder such as an SBR emulsion is used, a thickener such as carboxymethyl cellulose (CMC) can also be used.

To improve cycle characteristics, polyacrylic acid and polyimide, among the above negative electrode binders, are preferred, and polyacrylic acid is more preferred.

The polyacrylic acid may be a polymer comprising a monomer unit represented by the following formula (1), derived from a (meth)acrylic acid or a metal salt thereof. Herein, the term "(meth)acrylic acid" means acrylic acid and methacrylic acid.

(1)

In formula (1), $R^1$ is a hydrogen atom or a methyl group.

The carboxylic acid in a monomer unit represented by formula (1) may be a carboxylic acid metal salt. The metal is preferably a monovalent metal. Examples of the monovalent metal include alkali metals (for example, Na, Li, K, Rb, Cs, Fr and the like) and precious metals (for example, Ag, Au, Cu and the like). Among these, alkali metals are preferred. As the alkali metals, Na, Li and K are preferred, and Na is most preferred. When the polyacrylic acid contains the carboxylic acid salt at least in part, adhesiveness to constituent materials of the active material layer may be further improved in some cases.

The polyacrylic acid may comprise other monomer units. When the polycarylic acid further comprises monomer units other than the (meth)acrylic acid monomer units, the peel strength between the active material layer and the current collector may be improved in some cases. Examples of other monomer units include monomer units derived from monomers, such as acids having ethylenically unsaturated group, for example, monocarboxylic acid compounds such as crotonic acid and pentenoic acid, dicarboxylic acid compounds such as itaconic acid and maleic acid, sulfonic acid compounds such as vinylsulfonic acid, and phosphonic acid compounds such as vinylphosphonic acid; aromatic olefins having acidic group such as styrene sulfonic acid, and styrene carboxylic acid; (meth)acrylic acid alkyl esters; acrylonitrile; aliphatic olefins such as ethylene, propylene, and butadiene; aromatic olefins such as styrene; and the like. In addition, other monomer units may be monomer units constituting a known polymer that is used as a binder for a secondary battery. If present, acids may be also replaced with their salts in these monomer units.

In addition, in the polyacrylic acid according to present embodiment, at least one hydrogen atom in a main chain and a side chain may be substituted by halogen (fluorine, chlorine, bromine, iodine, etc.) or the like.

When the polyacrylic acid according to present embodiment is a copolymer containing two or more types of monomer units, the copolymer may be a random copolymer, an alternating copolymer, a block copolymer, a graft copolymer or combinations thereof.

The polyimide may be a polymer comprising a monomer unit represented by the following formula (2).

(2)

In formula (2), A represents a tetravalent group of a tetracarboxylic acid dianhydride, from which acid anhydride groups have been removed, and B represents a divalent group of a diamine, from which amino groups have been removed.

The tetracarboxylic acid dianhydrides and the diamines are generally used as polyimide raw materials. The tetracarboxylic acid dianhydride and the diamine condense to form imide group of formula (2).

The polyimide is not particularly limited, and commercially available polyimide may be used. Examples of the tetracarboxylic acid dianhydride for forming A of formula (2), include aromatic tetracarboxylic acid dianhydrides, such as 3,3',4,4'-biphenyltetracarboxylic dianhydride, pyromellitic dianhydride, 3,4'-oxydiphthalic anhydride, 4,4'-oxydiphthalic anhydride and 3,3',4,4'-benzophenonetetracarboxylic dianhydride, and aliphatic tetracarboxylic acid dianhydrides, such as cyclobutanetetracarboxylic dianhydride, 1,2,3,4-cyclopentanetetracarboxylic dianhydride, 1,2,4,5-cyclohexanetetracarboxylic dianhydride, bicyclo[2.2.1]heptane-2,3,5,6-tetracarboxylic dianhydride and 1,2,3,4-butanetetracarboxylic dianhydride. Examples of the diamine for forming B of formula (2) include aromatic diamines, such as p-phenylenediamine, m-phenylenediamine, p-xylenediamine and m-xylylenediamine, and aliphatic diamines, such as cyclohexanediamine, di(aminomethyl)cyclohexane, diaminomethylbicycloheptane, and diaminomethyloxybicycloheptane.

The polyimide binder may comprise an imidization promotor, which promotes the reaction of a polyamic acid that is a precursor to a polyimide.

The lower limit of the amount of the negative electrode binder is preferably 1 part by weight or more, and more preferably 2 parts by weight or more, and the upper limit is preferably 30 parts by weight or less, and more preferably 25 parts by weight or less, based on 100 parts by weight of the negative electrode active material.

From the viewpoint of improving the conductivity, the negative electrode may comprise a conductive assisting agent, for example, carbon, such as carbonaceous fine particles of graphite, carbon black, acetylene black and the like.

As the negative electrode current collector, from the viewpoint of electrochemical stability, aluminum, nickel, stainless steel, chrome, copper, silver, or an alloy thereof may be used. As the shape thereof, foil, flat plate, mesh and the like are exemplified.

The negative electrode according to the present embodiment may be prepared, for example, by preparing a slurry comprising the negative electrode active material, the conductive assisting agent, the negative electrode binder and a solvent, and applying this to the negative electrode current collector to form the negative electrode active material layer. Examples of a method for forming the negative electrode active material layer include a doctor blade method, a die coater method, a CVD method, a sputtering method, and the like. After forming the negative electrode active material layer in advance, a thin film of aluminum, nickel or an alloy thereof as a negative electrode current collector may be formed thereon by a method such as vapor deposition or sputtering, to prepare a negative electrode.

<Positive Electrode>

The positive electrode comprises a positive electrode current collector and a positive electrode active material layer comprising a positive electrode active material, a positive electrode binder, and optionally a conductive assisting agent.

The positive electrode active material may be selected from some viewpoints. From the viewpoint of high energy density, it is preferable to contain a compound having high capacity. Examples of the high capacity compound include lithium nickelate ($LiNiO_2$) and lithium nickel composite oxides in which a part of the Ni of lithium nickelate is replaced by another metal element, and layered lithium nickel composite oxides represented by the following formula (C) are preferred.

$$Li_yNi_{(1-x)}M_xO_2 \tag{C}$$

wherein $0 \leq x < 1$, $0 < y \leq 1.2$, and M is at least one element selected from the group consisting of Co, Al, Mn, Fe, Ti, and B.

From the viewpoint of high capacity, it is preferred that the content of Ni is high, that is, x is less than 0.5, further preferably 0.4 or less in the formula (C). Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $\beta \geq 0.7$, and $\gamma \leq 0.2$) and $Li_\alpha Ni_\beta Co_\gamma Al_\delta O_2$ ($0 < \alpha \leq 1.2$, preferably $1 \leq \alpha \leq 1.2$, $\beta+\gamma+\delta=1$, $\beta \geq 0.6$, preferably $\beta \geq 0.7$, and $\gamma \leq 0.2$) and particularly include $LiNi_\beta Co_\gamma Mn_\delta O_2$ ($0.75 \leq \beta \leq 0.85$, $0.05 \leq \gamma \leq 0.15$, and $0.10 \leq \delta \leq 0.20$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}Al_{0.1}O_2$ may be preferably used.

From the viewpoint of thermal stability, it is also preferred that the content of Ni does not exceed 0.5, that is, x is 0.5 or more in the formula (C). In addition, it is also preferred that particular transition metals do not exceed half. Examples of such compounds include $Li_\alpha Ni_\beta Co_\gamma Mn_\delta O_2$ ($0 < \alpha \leq 1.2$, preferably $1 \leq \alpha \leq 1.2$, $\beta+\gamma+\delta=1$, $0.2 \leq \beta \leq 0.5$, $0.1 \leq \gamma \leq 0.4$, and $0.1 < \delta \leq 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In addition, two or more compounds represented by the formula (C) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (C)) and a material in which the content of Ni does not exceed 0.5 (x is 0.5 or more, for example, NCM433), a battery having high capacity and high thermal stability can also be formed.

The layered lithium nickel composite oxide may be further replaced by another metal element. For example, a layered lithium nickel composite oxide represented by the following formula (D) may be preferably used.

$$Li_aNi_bCo_cM1_dM2_eO_f \tag{D}$$

wherein $0.8 \leq a \leq 1.2$, $0.5 \leq b < 1.0$, $0.005 \leq c \leq 0.4$, $0.005 \leq d \leq 0.4$, $0 \leq e < 0.1$, $1.8 \leq f \leq 2.3$, $b+c+d+e=1$, M1 is Mn or Al, and M2 is one or more metals selected from the group consisting of B, Na, Mg, Al, S, K, Ca, Ti, V, Cr, Fe, Cu, Zn, Zr, Nb, Mo, Sn, Pb and W.

Examples of the positive electrode active materials other than the above include lithium manganate having a layered structure or a spinel structure such as $LiMnO_2$, $Li_xMn_2O_4$ ($0 < x < 2$), $Li_2MnO_3$, $xLi_2MnO_3\text{-}(1-x)LiMO_2$ ($0.1 < x < 0.8$, and M is one or more elements selected from the group consisting of Mn, Fe, Co, Ni, Ti, Al and Mg) and $Li_xMn_{1.5}Ni_{0.5}O_4$ ($0 < x < 2$); $LiCoO_2$ or materials in which a part of the transition metal in this material is replaced by other metal(s); materials in which Li is excessive as compared with the stoichiometric composition in these lithium transition metal oxides; materials having an olivine structure such as $LiFePO_4$; and the like. In addition, materials in which these metal oxides are partially substituted by Al, Fe, P, Ti, Si, Pb, Sn, In, Bi, Ag, Ba, Ca, Hg, Pd, Pt, Te, Zn, La or the like are also usable. The positive electrode active materials described above may be used alone or in combination of two or more.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide and the like may be used. Also, the positive electrode binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) can also be used. The lower limit of the amount of the positive electrode binder is preferably 1 part by weight or more, and more preferably 2 parts by weight or more, and the upper limit is preferably 30 parts by weight or less, and more preferably 25 parts by weight or less, based on 100 parts by weight of the positive electrode active material.

For the positive electrode active material layer, a conductive assisting agent may be added for the purpose of lowering the impedance. Examples of the conductive assisting agent include flake-like, soot, and fibrous carbon fine particles and the like, for example, graphite, carbon black, acetylene black, vapor grown carbon fibers and the like.

As the positive electrode current collector, from the view point of electrochemical stability, aluminum, nickel, copper, silver, and alloys thereof are preferred. As the shape thereof, foil, flat plate, mesh and the like are exemplified. In particular, a current collector with aluminum, an aluminum alloy, or iron-nickel-chromium-molybdenum based stainless steel is preferable.

The positive electrode may be prepared by forming the positive electrode active material layer comprising the positive electrode active material and the positive electrode binder on the positive electrode current collector. Examples of a method of forming the positive electrode active material layer include a doctor blade method, a die coater method, a CVD method, a sputtering method, and the like. After forming the positive electrode active material layer in advance, a thin film of aluminum, nickel or an alloy thereof as a positive electrode current collector may be formed thereon by a method such as vapor deposition or sputtering, to prepare a positive electrode.

<Electrolyte Solution>

The electrolyte solution of the lithium ion secondary battery according to the present embodiment is not particularly limited, but is preferably a non-aqueous electrolyte solution containing a non-aqueous solvent and a supporting salt which are stable to operation potentials of the battery.

Examples of the non-aqueous solvent include aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (EMC) and dipropyl carbonate (DPC); carbonate derivatives; aliphatic carboxylic acid esters such as methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; fluorinated aprotic organic solvents obtainable by substituting at least part of hydrogen atoms of these compounds with fluorine atom(s); and the like.

Among them, cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (EMC), dipropyl carbonate (DPC) or the like is preferably contained.

The non-aqueous solvents may be used alone, or in combination of two or more.

The supporting salt is not particularly limited except that it comprises Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(FSO_2)_2$ (abbreviated as LiFSI), $LiN(CF_3SO_2)_2$, $LiN(C_2F_5SO_2)_2$, $LiB_{10}Cl_{10}$ and the like. Besides these, the supporting salt includes lower aliphatic lithium carboxylate, chloroboran lithium, lithium tetraphenylborate, LiBr, LiI, LiSCN, LiCl and the like. Among these, $LiPF_6$ and LiFSI are particularly preferred from the viewpoint of oxidation resistance, reduction resistance, stability and solubility. The supporting salts may be used alone or in combination of two or more. The amount of the supporting salt is preferably 0.4 mol or more and 1.5 mol or less, more preferably 0.5 mol or more and 1.2 mol or less with respect to 1 L of the electrolyte solvent.

The electrolyte solution preferably comprises a fluorinated acid anhydride. The electrolyte solution comprising the fluorinated acid anhydride can form a coating film capable of preventing the decomposition of the electrolyte solution on the negative electrode surface when the lithium ion secondary battery is subjected to charge and discharge. The fluorine substitution ratio of the fluorinated acid anhydride {i.e., (the number of fluorine atoms)/(the total number of hydrogen atoms and fluorine atoms)} is preferably high. The fluorine substitution ratio of the fluorinated acid anhydride is preferably 25% or more, more preferably 50% or more and most preferably 100%.

In the present embodiment, the fluorinated acid anhydride having a cyclic structure (hereinafter, also referred to as "fluorinated cyclic acid anhydride") is preferred.

Examples of the fluorinated cyclic acid anhydride of the present embodiment include, but not particularly limited to, carboxylic acid anhydrides, sulfonic acid anhydrides, and carboxylic sulfonic anhydrides.

Specific examples of the fluorinated carboxylic acid anhydride having a cyclic structure include, but not limited to, fluorides of succinic anhydride, glutaric anhydride, maleic anhydride, citraconic anhydride, glutaconic anhydride, itaconic anhydride, diglycolic anhydride, phenyl succinic anhydride, 2-phenyl glutaric anhydride, cyclohexanedicarboxylic anhydride, cyclopentanetetracarboxylic dianhydride, 4-cyclohexene-1,2-dicarboxylic anhydride, 3,4,5,6-tetrahydrophthalic anhydride, 5-norbornene-2,3-dicarboxylic anhydride, phthalic anhydride, pyromellitic anhydride and the like, for example, fluorosuccinic anhydride, tetrafluorosuccinic anhydride, difluoroglutaric anhydride and the like. These may be used alone or in combination of two or more.

Specific examples of the fluorinated sulfonic acid anhydride having a cyclic structure include, but not limited to, fluorides of 1,2-ethanedisulfonic anhydride, 1,3-propanedisulfonic anhydride, 1,4-butanedisulfonic anhydride, 1,2-benzenedisulfonic anhydride and the like, for example, tetrafluoro-1,2-ethanedisulfonic anhydride, hexafluoro-1,3-propanedisulfonic anhydride, octafluoro-1,4-butanedisulfonic anhydride, 3-fluoro-1,2-benzenedisulfonic anhydride, 4-fluoro-1,2-benzenedisulfonic anhydride, 3,4,5,6-tetrafluoro-1,2-benzenedisulfonic anhydride and the like. These may be used alone or in combination of two or more.

Specific examples of the carboxylic sulfonic anhydride having a cyclic structure include, but not limited to, fluorides of 3-sulfopropionic acid anhydride, 2-methyl-3-sulfopropionic acid anhydride, 2,2-dimethyl-3-sulfopropionic acid anhydride, 2-ethyl-3-sulfopropionic acid anhydride, 2,2-diethyl-3-sulfopropionic acid anhydride and the like, for example, 2-fluoro-3-sulfopropionic acid anhydride, 2,2-difluoro-3-sulfopropionic acid anhydride, 2,2,3,3-tetrafluoro-3-sulfopropionic acid anhydride; fluorides of 2-sulfobenzoic anhydride and the like, for example, 3-fluoro-2-sulfobenzoic anhydride, 4-fluoro-2-sulfobenzoic anhydride, 5-fluoro-2-sulfobenzoic anhydride, 6-fluoro-2-sulfobenzoic anhydride, 3,6-difluoro-2-sulfobenzoic anhydride, 3,4,5,6-tetrafluoro-2-sulfobenzoic anhydride, 3-trifluoromethyl-2-sulfobenzoic anhydride, 4-trifluoromethyl-2-sulfobenzoic anhydride, 5-trifluoromethyl-2-sulfobenzoic anhydride, 6-trifluoromethyl-2-sulfobenzoic anhydride. These may be used alone or in combination of two or more.

In the present embodiment, the fluorinated cyclic acid anhydride is preferably the fluorinated cyclic carboxylic acid anhydride. In addition, the fluorinated cyclic carboxylic acid anhydride is preferably a fluorinated cyclic carboxylic acid anhydride represented by the following formula (3).

In formula (3), $R_{11}$ is a substituted or unsubstituted alkylene group having 1 to 5 carbon atoms, a substituted or unsubstituted alkenylene group having 2 to 5 carbon atoms, a substituted or unsubstituted cycloalkan-diyl group having 5 to 12 carbon atoms, a substituted or unsubstituted cycloalken-diyl group having 5 to 12 carbon atoms, a substituted or unsubstituted benzene-diyl group, or a divalent group having 2 to 6 carbon atoms in which alkylene groups are bonded via an ether bond, with the proviso that at least part of hydrogen atoms in $R_{11}$ are replaced by a fluorine atom(s).

In the formula (3), the alkylene group and the alkenylene group for $R^{11}$ may be straight chain or branched.

In the formula (3), the number of carbon atoms in the alkylene group for $R_{11}$ is preferably 1, 2, 3 or 4. The number of carbon atoms in the alkenylene group for $R_{11}$ is preferably 2, 3 or 4.

In the formula (3), the number of carbon atoms in the cycloalkan-diyl group and the cycloalken-diyl group for $R_{11}$ is preferably 5, 6, 7, 8, 9 or 10. Herein, the cycloalkan-diyl group and the cycloalken-diyl group may be a divalent group having a plurality of ring structures such as bicycloalkylene group or bicycloalkenylene group.

In the formula (3), the divalent group having 2 to 6 carbon atoms in which alkylene groups are bonded via an ether bond represents a divalent group in which two or more alkylene groups are bonded via ether bond(s) (—O—), wherein two or more alkylene groups may be either the same or different. The alkylene group may have a branched chain. The total number of carbon atoms of two or more alkylene groups is preferably 2, 3, 4 or 5, and more preferably 2, 3 or 4.

In the formula (3), $R_{11}$ is more preferably a substituted or unsubstituted alkylene group having 2 to 5 carbon atoms, or a substituted or unsubstituted alkenylene group having 2 to 5 carbon atoms. $R_{11}$ is still more preferably a substituted or unsubstituted alkylene group having 2 to 3 carbon atoms, or a substituted or unsubstituted alkenylene group having 2 to 3 carbon atoms.

Further, in the formula (3), it is more preferable that the carbon skeleton (carbon-carbon bonds) in $R_{11}$ is constituted all by single bonds. This is seemingly because that gas generation caused by an excessive reaction is reduced as compared with the case of $R_{11}$ containing a double bond. For example, $R_{11}$ is more preferably an alkylene group.

In the formula (3), substituents for $R_{11}$ include, for example, alkyl groups having 1 to 5 carbon atoms (for example, methyl group, ethyl group, propyl group, isopropyl group, butyl group), alkenyl groups having 2 to 6 carbon atoms (for example, vinyl group, 1-propenyl group, 2-propenyl group, 2-butenyl group), aryl groups (for example, phenyl group, benzyl group, tolyl group and xylyl group), alkoxy groups having 1 to 5 carbon atoms (for example, methoxy group, ethoxy group, n-propoxy group, isopropoxy group, n-butoxy group, tert-butoxy group), amino groups (including dimethylamino group, methylamino group), carboxy group, hydroxy group, vinyl group, cyano group and halogen atoms (for example, chlorine atom, bromine atom). $R_{11}$ may have one substituent or may have a plurality of substituents.

Preferable examples of the fluorinated cyclic carboxylic acid anhydride include fluorides of succinic anhydride and glutaric anhydride. In particular, compounds obtained by replacing all hydrogens of an unsubstituted cyclic carboxylic acid anhydride by fluorine are preferred. Specific examples thereof include perfluoroglutaric anhydride (FGA) and perfluorosuccinic anhydride.

A fluorinated open chain acid anhydride may be used.

Examples of the fluorinated open chain acid anhydride include fluorides of carboxylic acid anhydrides such as acetic anhydride, propionic anhydride, butyric anhydride, crotonic anhydride and benzoic anhydride, for example, monofluoroacetic anhydride, trifluoroacetic anhydride, and pentafluoropropionic anhydride; fluorides of sulfonic acid anhydrides such as methanesulfonic anhydride, ethanesulfonic anhydride, propanesulfonic anhydride, butanesulfonic anhydride, pentanesulfonic anhydride, hexanesulfonic anhydride, vinylsulfonic anhydride and benzenesulfonic anhydride, for example, trifluoromethanesulfonic anhydride, 2,2,2-trifluoroethane sulfonic anhydride, and pentafluoroethanesulfonic anhydride; fluorides of carboxylic sulfonic anhydrides such as acetic methanesulfonic anhydride, acetic ethanesulfonic anhydride, acetic propanesulfonic anhydride, propionic methanesulfonic anhydride, propionic ethanesulfonic anhydrides and propionic propanesulfonic anhydride, for example, trifluoroacetic methanesulfonic anhydride, trifluoroacetic ethanesulfonic anhydride, trifluoroacetic propanesulfonic anhydride, acetic trifluoromethanesulfonic anhydride, acetic 2,2,2-trifluoroethane sulfonic anhydride, acetic pentafluoroethane sulfonic anhydride, trifluoroacetic trifluoromethanesulfonic anhydride, trifluoroacetic 2,2,2-trifluoroethanesulfonic anhydride, and trifluoroacetic pentafluoroethanesulfonic anhydride; and the like.

Among them, fluorinated carboxylic acid anhydrides are preferred, and compounds represented by the following formula (4) are more preferred.

In formula (4), $R_{101}$ and $R_{102}$ each independently represent a substituted or unsubstituted alkyl group having 1 to 6 carbon atoms, a substituted or unsubstituted aryl group having 6 to 12 carbon atoms, a substituted or unsubstituted heterocyclic group having 4 to 12 carbon atoms, or a substituted or unsubstituted alkenyl group having 2 to 6 carbon atoms, wherein at least one of hydrogen atoms in $R_{101}$ and $R_{102}$ is replaced by fluorine atom(s).

In $R_{101}$ and $R_{102}$ of the formula (4), the number of carbon atoms in the alkyl group is preferably 1, 2, 3, 4 or 5, more preferably 1, 2, 3 or 4. The number of carbon atoms in the aryl group is preferably 6, 7, 8, 9 or 10. Examples of aryl group include phenyl group, benzyl group, tolyl group and xylyl group. The number of carbon atoms in the heterocyclic group is preferably 4, 5, 6, 7, 8, 9 or 10, and more preferably 4, 5, 6, 7 or 8. The heterocyclic group comprises at least one hetero atom such as oxygen, nitrogen and sulfur, and examples thereof include pyrrolyl group, pyridinyl group, furyl group, thienyl group and morpholino group. The number of carbon atoms in the alkenyl group is preferably 2, 3, 4 or 5, more preferably 2, 3 or 4. Further, the alkyl group or alkenyl group may be straight chain or branched.

In formula (4), $R_{101}$ and $R_{102}$ are each independently more preferably an alkyl group having 1 to 5 carbon atoms. The alkyl group may be straight chain or branched. The number of carbon atoms in the alkyl group is more preferably 1, 2, 3 or 4.

The substituents for $R_{101}$ and $R_{102}$ include, for example, alkyl group having 1 to 5 carbon atoms (for example, methyl group, ethyl group, propyl group, isopropyl group, butyl group), cycloalkyl group having 3 to 6 carbon atoms (for example, cyclopropyl group, cyclobutyl group, cyclopentyl group, cyclohexyl group), alkynyl group having 2 to 5 carbon atoms (for example, acetylenyl group, 1-propynyl group, 2-propynyl group, 2-butynyl group), alkoxy group having 1 to 5 carbon atoms (for example, methoxy group, ethoxy group, n-propoxy group, iso-propoxy group, n-butoxy group, tert-butoxy group), alkylcarbonyl group having 2 to 6 carbon atoms, arylcarbonyl group having 7 to 11 carbon atoms, alkoxycarbonyl group having 2 to 6 carbon atoms (for example, methoxycarbonyl group, ethoxycarbonyl group, tert-butoxycarbonyl group), aryloxycarbonyl group having 7 to 11 carbon atoms, alkylcarbonyloxy group having 2 to 6 carbon atoms, arylcarbonyloxy group having 7 to 11 carbon atoms, aryl group having 6 to 12 carbon atoms (for example, phenyl group, naphthyl group), aryloxy group having 6 to 10 carbon atoms (for example, phenoxy group, naphthoxy group), alkylthio group having 1 to 5 carbon atoms (for example, methylthio group, ethylthio group, n-propylthio group, iso-propylthio group, n-butylthio group, tert-butylthio group), arylthio group having 6 to 10 carbon atoms (for example, phenylthio group, naphthylthio group), alkylthiocarbonyl group having 2 to 6 carbon atoms, arylthiocarbonyl group having 7 to 11 carbon atoms, alkylsulfinyl group having 1 to 5 carbon atoms, arylsulfinyl group having 6 to 10 carbon atoms, alkylsulfonyl group having 1 to 5 carbon atoms, arylsulfonyl group having 6 to 10 carbon atoms, heteroatom-containing aromatic group having 4 to 8 carbon atoms (for example, furyl group, thienyl group), amino group (including dimethylamino group, methylamino group), carboxy group, hydroxy group, cyano group, halogen atom (for example, chlorine atom, bromine atom) and the like. $R_{101}$ and $R_{102}$ each independently may have one substituent or a plurality of substituents.

The fluorinated open chain carboxylic acid anhydride is particularly preferably a fluoride of acetic anhydride, propionic anhydride or butyric anhydride. In particular, a compound formed by replacing all of hydrogen atoms of an unsubstituted open-chain carboxylic acid anhydride with fluorine atoms is preferred. Specific examples thereof include trifluoroacetic anhydride, perfluoropropionic anhydride, heptafluorobutyric anhydride and the like.

The fluorinated acid anhydride may be used alone or in combination of two or more thereof.

The concentration of the fluorinated acid anhydride in the electrolyte solution is, but not particularly limited to, preferably 0.005 to 10 weight %. When the concentration of the fluorinated acid anhydride is 0.005 weight % or more, the coating film of the present embodiment can be formed effectively. Further, moisture in the negative electrode can be effectively trapped. When the concentration of the fluorinated acid anhydride is 10 weight % or less, it is possible to prevent the coating film from becoming thick, and an increase in resistance caused by the coating film can be reduced. The content of the fluorinated acid anhydride in the electrolyte solution is more preferably 0.1 weight % or more, and still more preferably 1 weight % or more. The content of the fluorinated acid anhydride in the electrolyte solution is more preferably 8 weight % or less, and still more preferably 6 weight % or less.

<Negative Electrode Coating Film>

The negative electrode of the present embodiment has on its surface a coating film which prevents the decomposition of the electrolyte solution. For this reason, the lithium ion secondary battery of the present embodiment has excellent cycle characteristics. Such a coating film has specific peaks detected by surface analysis of the negative electrode, particularly the negative electrode active material layer, by X-ray photoelectron spectrometry (hereinafter also referred to as XPS).

In a C1s spectrum obtained by the surface analysis of the negative electrode by X-ray photoelectron spectroscopy, the lower limit of the ratio (Ia/Ib) of the peak intensity (Ia) at 290 eV to the peak intensity (Ib) at 285 eV is 0.7 or more and preferably 0.8 or more, and the upper limit is preferably 4 or less, and more preferably 2 or less. The lower limit of the ratio (Ia/Ic) of the peak intensity (Ia) at 290 eV to the peak intensity (Ic) at 292 eV is preferably 1 or more and more preferably 1.2 or more, and the upper limit is preferably 4 or less and more preferably 3 or less. A Peak around 290 to 294 eV is derived from a bonding between a carbon atom and a fluorine atom, such as CH—C*F$_2$, CF$_x$—O$_y$ or F—C. In the present embodiment, it is thought that the coating film formed on the negative electrode surface comprises a carbon atom that is bonded to a fluorine atom in this way.

In a P2p spectrum obtained by surface analysis of the negative electrode by X-ray photoelectron spectroscopy, the maximum peak in the range of 130 eV or more and 140 eV or less is preferably present in the range of 135 eV or more and 138 eV or less. Since the negative electrode has the coating film comprising carbon bonded to a fluorine atom as described above, the decomposition of the electrolyte can be reduced. For this reason, in the present embodiment, formation of coating film generated by the decomposition of the electrolyte can be suppressed. A Peak with binding energy of 130 eV or more and less than 135 eV is derived from a bonding between a phosphorus atom and an oxygen atom, such as P—O$_y$ or PF$_x$—O$_y$. A Peak with binding energy of 135 eV or more and 138 eV or less is derived from a bonding of a phosphorus atom, such as P—F. It is thought that the coating film comprising such bondings is generated by the decomposition of the electrolyte such as LiPF$_6$. In the present embodiment, peak intensity may be significantly reduced in the range of 130 eV or more and less than 135 eV compared to in the range of 135 eV or more and 138 eV or less.

In a F1s spectrum obtained by surface analysis of the negative electrode by X-ray photoelectron spectroscopy, the maximum peak in the range of 680 eV or more and 695 eV or less is preferably present in the range of 686 eV or more and 690 eV or less. In addition, the lower limit of the ratio (If/Ie) of the maximum peak intensity (If) in the range of 686 eV or more and 695 eV or less to the maximum peak intensity (Ie) in the range of 680 eV or more and less than 686 eV is preferably 2 or more and more preferably 2.5 or more, and the upper limit is preferably 8 or less and more preferably 6 or less. A Peak with binding energy of 686 eV or more and 695 eV or less is derived from a bonding between a fluorine atom and a carbon atom, such as F—C. In the present embodiment, it is thought that the coating film formed on the negative electrode surface comprises a fluorine atom having such a bonding. A Peak with binding energy of 680 eV or more and less than 686 eV is derived from a bonding between a fluorine atom and a metal atom. When the coating film is formed on the negative electrode surface, the maximum peak intensity (If) in the range of 686 eV or more and 695 eV or less may be higher than the maximum peak intensity (Ie) in the range of 680 eV or more and less than 686 eV.

The coating film having the above XPS spectrum can be formed on the negative electrode surface by performing charging and discharging a lithium ion secondary battery which is produced with the above negative electrode comprising the Si material in the negative electrode active material layer and the above electrolyte solution comprising the fluorinated acid anhydride. The fluorinated acid anhydride may or may not remain in the electrolyte solution after the coating film is formed. The coating film is considered to be derived from the fluorinated acid anhydride, and at least part of the fluorinated acid anhydride may decompose in the formation of the coating film.

During or after the first charge, it is preferable to provide a step of removing gas in the battery. By removing gas derived from water, the coating film is uniformly formed on the electrode surface. For this reason, more excellent battery characteristics can be provided. The step of removing gas is preferably performed at a voltage lower than the fully charged voltage. The first charge voltage may be therefore higher than the decomposition voltage of water and lower than the reaction voltage of the electrolyte additive. For example, the first charge voltage may be in the range of 2 V or more and 3.7 V or less. In addition, the current value is preferably low to generate as much gas as possible in the first charge. In this way, gas generation in later step is prevented. The current value in the first charge is preferably 0.5 C or less and more preferably 0.2 C or less with respect to the theoretical capacity (C) of the battery.

To form the coating film, the battery may be discharged after the first charge, and may be further charged and discharged. In this charge, the current value is preferably low to form the coating film uniformly. The charge current value after the first charge is preferably 0.5 C or less, and more preferably 0.2 C or less with respect to the theoretical capacity (C) of the battery.

To form the coating film, aging is preferably carried out after the charge and discharge. The aging is preferably carried out in a state of charge. The aging temperature is preferably 35° C. or more and 80° C. or less, and more preferably 40° C. or more and 60° C. or less. The aging period is preferably 24 hours or more, and more preferably 3 days or more. In addition, when production efficiency and the like are taken into consideration, it is preferably 40 days or less. By carrying out the aging, the stability of the coating film formed on the negative electrode surface can be improved as compared to before the aging, and the internal resistance can be reduced.

<Separator>

The separator may be of any type as long as it has durability against the electrolyte solution. Specific examples of a material thereof include polyolefins such as polypropylene and polyethylene, cellulose, polyesters such as polyethylene terephthalate and polybutylene terephthalate, polyimide, polyamide-imide, polyvinylidene fluoride, aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of the positive electrode, the negative electrode and the separator. Examples of a method for forming the insulation layer include a doctor blade method, a die coater method, a CVD method, a sputtering method, and the like. The insulation layer may be formed at the same time as forming the positive electrode, negative electrode or separator. Materials constituting the insulation layer include a mixture of an insulating filler such as aluminum oxide or barium titanate and a binder such as SBR or polyvinylidene fluoride.

<Structure of Secondary Battery>

Figure 1:
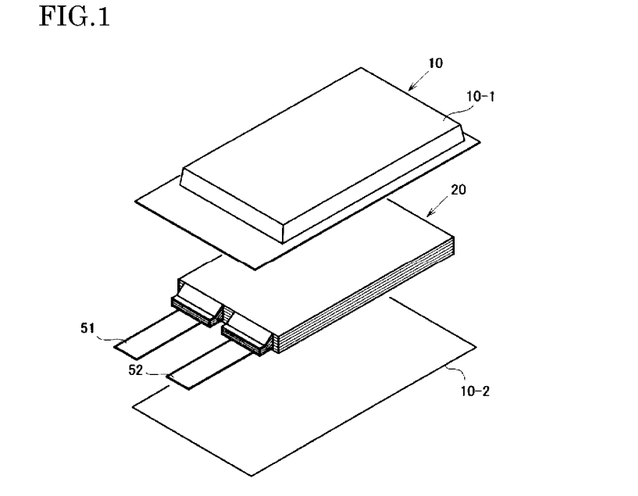
FIG. 1 is an exploded perspective view showing a basic structure of a film package battery.
Figure 2:
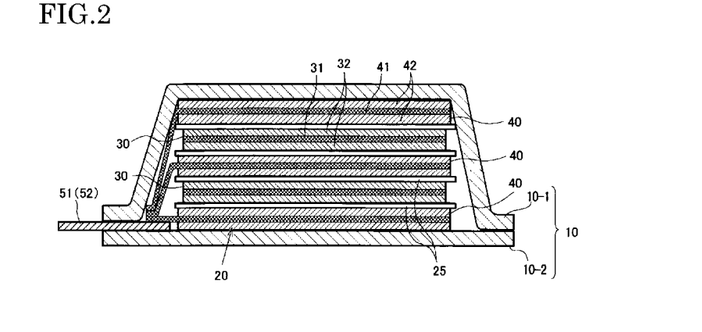
FIG. 2 is a sectional view schematically showing a section of the battery of FIG. 1.

The lithium ion secondary battery according to the present embodiment may have, for example, a structure as shown in FIGS. 1 and 2. This lithium ion secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the lithium ion secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The lithium ion secondary battery according to the present embodiment can be manufactured by a conventional method except for forming the coating film on the negative electrode. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the lithium ion secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of the lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and it may be a variety of power source of other vehicles, such as a moving body like a train.

EXAMPLES

Example 1

<Negative Electrode>

A silicon oxide having a carbon coating (weight ratio: silicon oxide/carbon=95/5) was used as a negative electrode active material. Hereinafter, this silicon oxide having a carbon coating will be simply referred to as silicon oxide or SiO. 90 weight % of the negative electrode active material, 1 weight % of acetylene black as a conductive assisting agent, and 9 weight % of a copolyacrylic acid comprising a monomer unit derived from acrylic acid sodium salt as a negative electrode binder were mixed, and then water was added thereto to prepare a negative electrode slurry. This was applied to both surfaces of a 10 μm-thick copper foil that is a current collector, dried at 80° C. for 5 minutes and subjected to a pressing process to produce a negative electrode. Herein, the weight % of each material means a percentage with respect to the total amount of the negative electrode active material, the conductive assisting agent and the binder.

<Positive Electrode>

$Li(Ni_{0.8}Co_{0.15}Al_{0.05})O_2$ was used as a positive electrode active material. This positive electrode active material, carbon black as a conductive assisting agent and polyvinylidene fluoride as a positive electrode binder were weighed at a weight ratio of 90:5:5. These were mixed with N-methylpyrrolidone to prepare a positive electrode slurry. The positive electrode slurry was applied to a 20 μm-thick aluminum foil, dried and further pressed to produce a positive electrode.

<Electrode Stack>

The fabricated three layers of the positive electrodes and four layers of the negative electrodes were stacked alternately with an aramid porous film as a separator sandwiched therebetween. The end portions of the positive electrode current collectors that were not covered with the positive electrode active material and the end portions of the negative electrode current collectors that were not covered with the negative electrode active material were welded individually. Further, to the welding positions, an aluminum positive electrode terminal and a nickel negative electrode terminal were welded respectively, to obtain an electrode stack having a planar stacked structure.

<Electrolyte Solution>

Ethylene carbonate (EC) and diethyl carbonate (DEC) were mixed at a compounding ratio (volume ratio) of EC/DEC=30/70 to prepare an electrolyte solvent. $LiPF_6$ as a supporting salt and perfluoroglutaric anhydride (FGA) as an additive were respectively added into this to prepare an electrolyte solution. The concentration of $LiPF_6$ in the electrolyte solution was 1.0 mol/L. The concentration of FGA in the electrolyte solution was 0.1 mol/L (1.86 weight %).

<Injection>

The electrode stack was accommodated in an aluminum laminate film as an outer package, and then the electrolyte solution was injected inside the outer package. Thereafter, vacuum impregnation (pressure: 10 kPa (abs)) was performed in a chamber, and the outer package was sealed to obtain a battery.

<Coating Film Formation>

The produced secondary battery was subjected to CCCV charge (upper limit voltage: 3.6 V, current: 0.15 C, CV time: 1.5 hours) in a thermostatic chamber maintained at 25° C. Thereafter, the sealed portion was opened, and gas was removed under reduced pressure. Next, the secondary battery was subjected to CC discharge (lower limit voltage: 3.0 V, current: 1 C), then subjected to CCCV charge (upper limit voltage: 4.2 V, current: 0.15 C, CV time: 1.5 hours), and aged in a thermostatic chamber maintained at 45° C. for 21 days.

<Surface Analysis of Negative Electrode by XPS>

The battery was disassembled to obtain one layer of the negative electrode. After washing the negative electrode with diethyl carbonate, the negative electrode surface was analyzed by XPS. An X-ray photoelectron spectrometer Quantera SXM made by PHI was used as an XPS surface analyzer for the coating film. In the analysis, a photoelectron spectrum was measured on the conditions that monochromated Al-Kα rays (1486.6 eV) were irradiated to the analytical sample (X-ray type=200 μm), and the photoelectron escape angle was 45°. To correct the energy of the photoelectron spectrum, the position of the main peak of carbon 1s (C1s) on the lowest binding energy side was set to 284.6 eV.

<Battery Evaluation>

On a battery which was produced in the same manner as the battery the negative electrode of which was subjected to the surface analysis by XPS, the coating film formation step was performed in the same manner. At this time, the increase ratio of the battery volume after aging to the battery volume before aging was measured. Then a cycle test was conducted. The cycle test was carried out as follows. 100 cycles of CCCV charge (upper limit voltage: 4.2 V, current: 1 C, CV time: 1.5 hours) and CC discharge (lower limit voltage: 3.0 V, current: 1 C) were carried out at 25° C. The ratio of discharge capacity at 100th cycle to discharge capacity at $1^{st}$ cycle was shown as capacity retention rate in Table 1.

Example 2

The silicon oxide and natural graphite (weight ratio: silicon oxide/natural graphite=70/30) were used as negative electrode active materials. The others were as in Example 1.

Comparative Example 1

Perfluoroglutaric anhydride was not added to the electrolyte solution. The others were as in Example 1.

Comparative Example 2

Fluoroethylene carbonate (FEC) was added to the electrolyte solution instead of perfluoroglutaric anhydride. The concentration of FEC in the electrolyte solution was adjusted to 0.1 mol/L (0.89 weight %). The others were as in Example 1.

Figure 3:
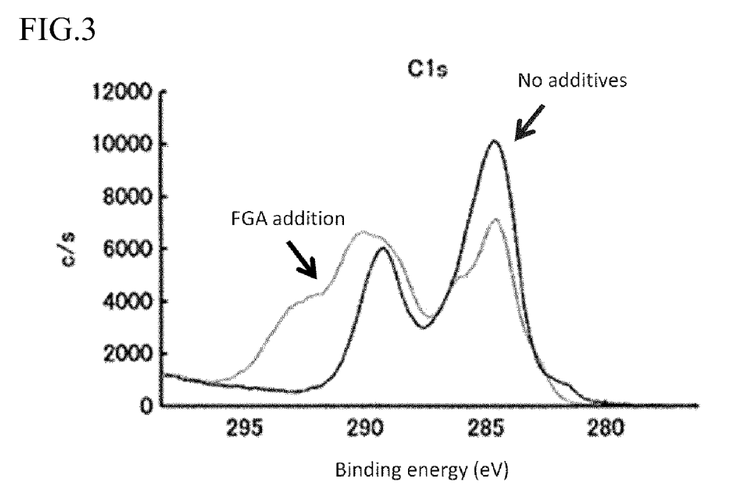
FIG. 3 is a narrow scan C1s XPS spectrum of a negative electrode surface of the lithium ion secondary battery.
Figure 4:
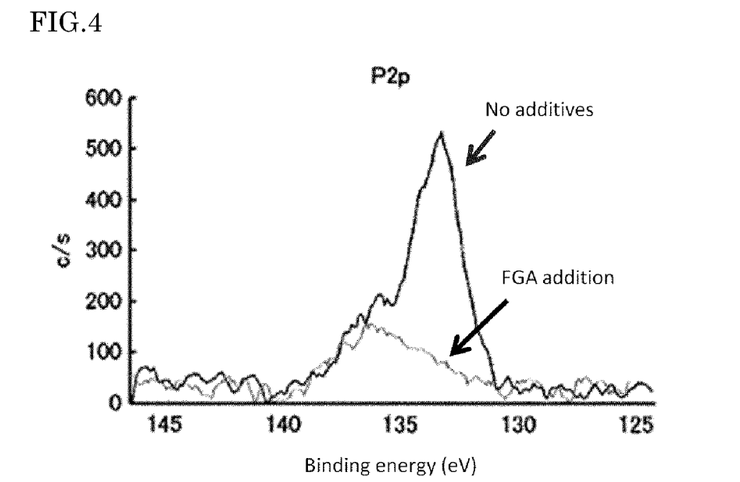
FIG. 4 is a narrow scan P2p XPS spectrum of a negative electrode surface of the lithium ion secondary battery.
Figure 5:
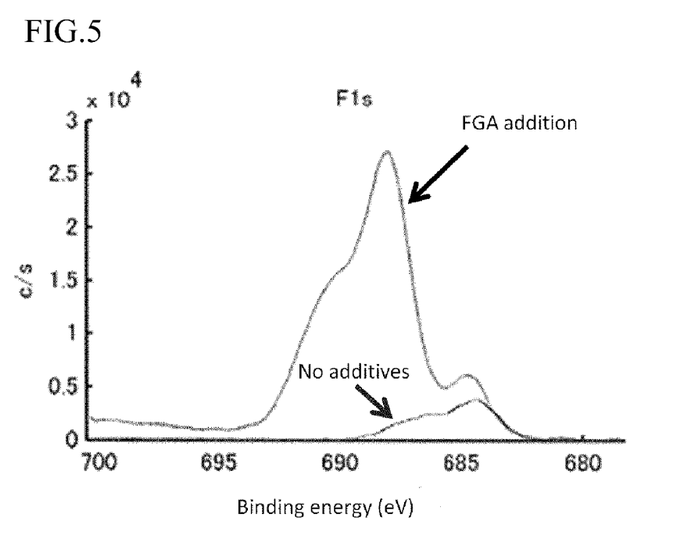
FIG. 5 is a narrow scan F1s XPS spectrum of a negative electrode surface of the lithium ion secondary battery.

Narrow scan XPS spectrums of Example 1 and Comparative example 1 are shown in FIGS. 3 to 5. In the XPS spectrums, the horizontal axis shows binding energy (eV), and the vertical axis shows spectral intensity (c/s). The spectrum varied depending on the presence or absence of glutaric anhydride and the type of the negative electrode active material. In the XPS spectrums, the peak at 290 eV is abbreviated as Ia, the peak at 285 eV is abbreviated as Ib, the peak at 292 eV is abbreviated as Ic, the maximum peak in the range of 686 eV or more and 695 eV or less is abbreviated as If, a maximum peak in the range of 680 eV or more and less than 686 eV is abbreviated as Ie, and the maximum peak in the range of 130 eV or more and 140 eV or less is abbreviated Id. Capacity retention rates, peak intensity ratios and maximum peak positions are shown in Table 1 as follows.

TABLE 1

| | Additive | Negative electrode active material | Capacity retention rate (%) | Volume increase ratio after aging (%) | Peak intensity ratio | | | Peak position (eV) |
| | | | | | C1s | | F1s | P2p |
| | | | | | Ia/Ib | Ia/Ic | If/Ie | Id |
|---|---|---|---|---|---|---|---|---|
| Example 1 | FGA | SiO/Graphite = 100/0 | 92.1 | 5.0 | 1.0 | 1.5 | 4.5 | 136.5 |
| Example 2 | FGA | SiO/Graphite = 70/30 | 94.6 | 7.7 | 0.7 | 3.5 | 2.6 | 134.0 |
| Comparative example 1 | — | SiO/Graphite = 100/0 | 82.8 | 18.2 | 0.5 | 6.7 | 0.7 | 133.5 |
| Comparative example 2 | FEC | SiO/Graphite = 100/0 | 88.8 | 19.8 | 0.4 | 4.4 | 0.6 | 134.0 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS

10 film outer package
20 battery element
25 separator
30 positive electrode
40 negative electrode

The invention claimed is:

1. A method for manufacturing a lithium ion secondary battery, comprising:
   producing a lithium ion secondary battery comprising a negative electrode comprising a Si material and an electrolyte solution comprising a fluorinated acid anhydride,
   charging the lithium ion secondary battery,
   removing gas from the lithium ion secondary battery, and aging the lithium ion secondary battery,
   wherein a ratio (Ia/Ib) of a peak intensity (Ia) at 290 eV to a peak intensity (Ib) at 285 eV is 0.7 or more in a C1s spectrum obtained by surface analysis of the negative electrode after the aging by X-ray photoelectron spectroscopy.

2. The method for manufacturing a lithium ion secondary battery according to claim 1, wherein a ratio (Ia/Ic) of the peak intensity (Ia) at 290 eV to a peak intensity (Ic) at 292 eV is 1 or more and 4 or less in the C1s spectrum obtained by surface analysis of the negative electrode after the aging by X-ray photoelectron spectroscopy.

3. The method for manufacturing a lithium ion secondary battery according to claim 1, wherein a maximum peak in a range of 130 eV or more and 140 eV or less is present in a range of 135 eV or more and 138 eV or less in a P2p spectrum obtained by surface analysis of the negative electrode after the aging by X-ray photoelectron spectroscopy.

4. The method for manufacturing a lithium ion secondary battery according to claim 1, wherein a ratio (If/Ie) of a maximum peak intensity (If) in a range of 686 eV or more and 695 eV or less to a maximum peak intensity (Ie) in a range of 680 eV or more and less than 686 eV is 2 or more in a F1s spectrum obtained by surface analysis of the negative electrode after the aging by X-ray photoelectron spectroscopy.

5. The method for manufacturing a lithium ion secondary battery according to claim 1, wherein a content of the fluorinated acid anhydride in the electrolyte solution is 0.005 weight % or more.

6. The method for manufacturing a lithium ion secondary battery according to claim 1, wherein the fluorinated acid anhydride is a fluorinated glutaric anhydride.

7. The method for manufacturing a lithium ion secondary battery according to claim 1, wherein a content of the Si material is 30 weight % or more with respect to the total amount of the negative electrode active material.

* * * * *